US006784831B1

(12) United States Patent
Wang et al.

(10) Patent No.: US 6,784,831 B1
(45) Date of Patent: Aug. 31, 2004

(54) METHOD AND APPARATUS FOR GPS SIGNAL RECEIVING THAT EMPLOYS A FREQUENCY-DIVISION-MULTIPLEXED PHASED ARRAY COMMUNICATION MECHANISM

(75) Inventors: James June-Ming Wang, San Marino, CA (US); Chau-Chin Yang, Los Angeles, CA (US); Wen Yen Lin, Arcadia, CA (US)

(73) Assignee: TIA Mobile, Inc., Pasadena, CA (US)

( * ) Notice: Subject to any disclaimer, the term of this patent is extended or adjusted under 35 U.S.C. 154(b) by 10 days.

(21) Appl. No.: 10/429,492

(22) Filed: May 5, 2003

(51) Int. Cl.$^7$ ............................. G01S 5/02; H04B 7/185
(52) U.S. Cl. ............................ 342/357.12; 342/357.06; 342/372; 701/213
(58) Field of Search ........................ 342/357.12, 357.06, 342/372; 701/213

(56) References Cited

U.S. PATENT DOCUMENTS

| 4,669,091 A | 5/1987 | Nossen ........................ 375/14 |
| 5,021,792 A | 6/1991 | Hwang ........................ 342/357 |
| 5,218,359 A | 6/1993 | Minamisono ................ 342/383 |
| 5,630,208 A | 5/1997 | Enge et al. ..................... 455/65 |
| 5,726,659 A | 3/1998 | Kee et al. ..................... 342/352 |
| 6,246,369 B1 | 6/2001 | Brown et al. ................. 343/700 |

OTHER PUBLICATIONS

"High Gain Advanced GPS Receiver", White Paper, NAVSYS Corporation, Colorado Springs, CO, Sep. 2002.
"GPS 12–Channel Correlator", Zarlink™ Semiconductor, Issue 3.2, Apr. 2001.
"Multipath Rejection Through Spatial Processing", by Alison Brown, NAVSYS Corporation, Proceedings of ION GSP 2000, Salt Lake City, Utah, Sep. 2000.
"Detection and Location of GPS Interference Sources Using Digital Receiver Electronic" by Alison Brown et al., NAVSYS Corporation, Proceedings of ION Annual Meeting, San Diego, CA, Jun. 2000.
"Direction Finding in Correlated Noise Fields Based on Joint Block–Diagonalization of Spatio–Temporal Correlation Matrices" by Adel Belouchrani, et al., IEEE Signal Processing Letters, vol. 4, No. 9, Sep. 1997.

Primary Examiner—Theodore M. Blum
(74) Attorney, Agent, or Firm—Gordon & Jacobson, P.C.

(57) ABSTRACT

An improved GPS signal receiver (and corresponding method of operation) includes a plurality of antenna elements each receiving a plurality of GPS signals (e.g., GPS LI signals or GPS L2 signals). A plurality of mixers (which correspond to the array of antenna elements) and a combining node convert the GPS signals received at the antenna elements in a frequency-division-multiplexed (FDM) manner over FDM frequency bands logically assigned to the antenna elements to produce a composite signal representing such GPS signals. An analog-to-digital converter converts an analog signal derived from the composite signal (which may be an intermediate frequency signal or a baseband signal) into a digital word stream. Demultiplexing logic extracts GPS signal components in the digital word stream. The GPS signal components correspond to the FDM frequency bands logically assigned to the antenna elements. Beam forming logic, operably coupled to the demultiplexing logic, applies variable phase delay and variable gain to each GPS component in accordance with a set of weight values supplied thereto. Preferably, the beam forming logic is controlled to perform adaptive beam steering/nulling operations that provide for interference cancellation, multipath rejection and improved signal reception.

35 Claims, 8 Drawing Sheets

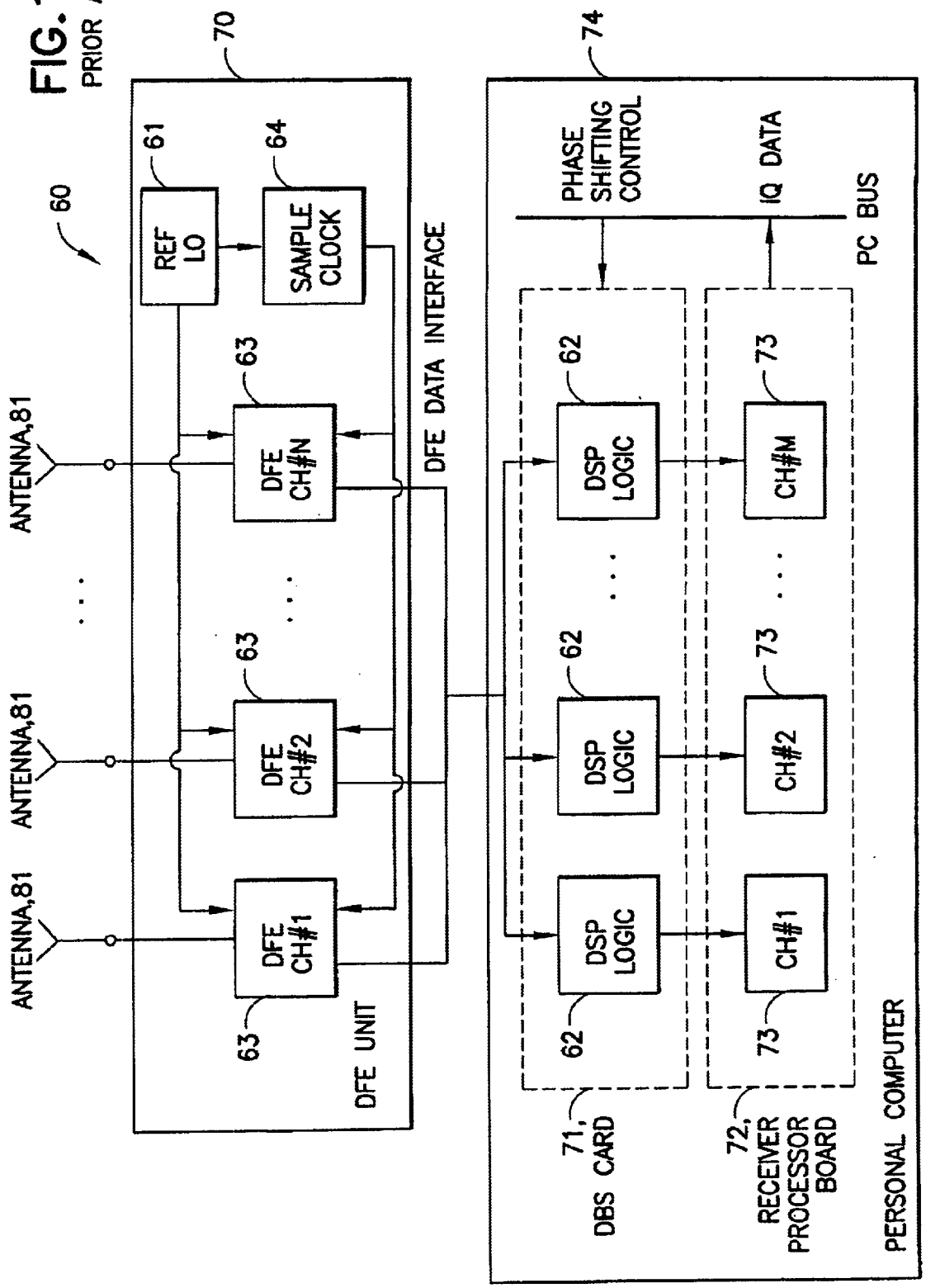

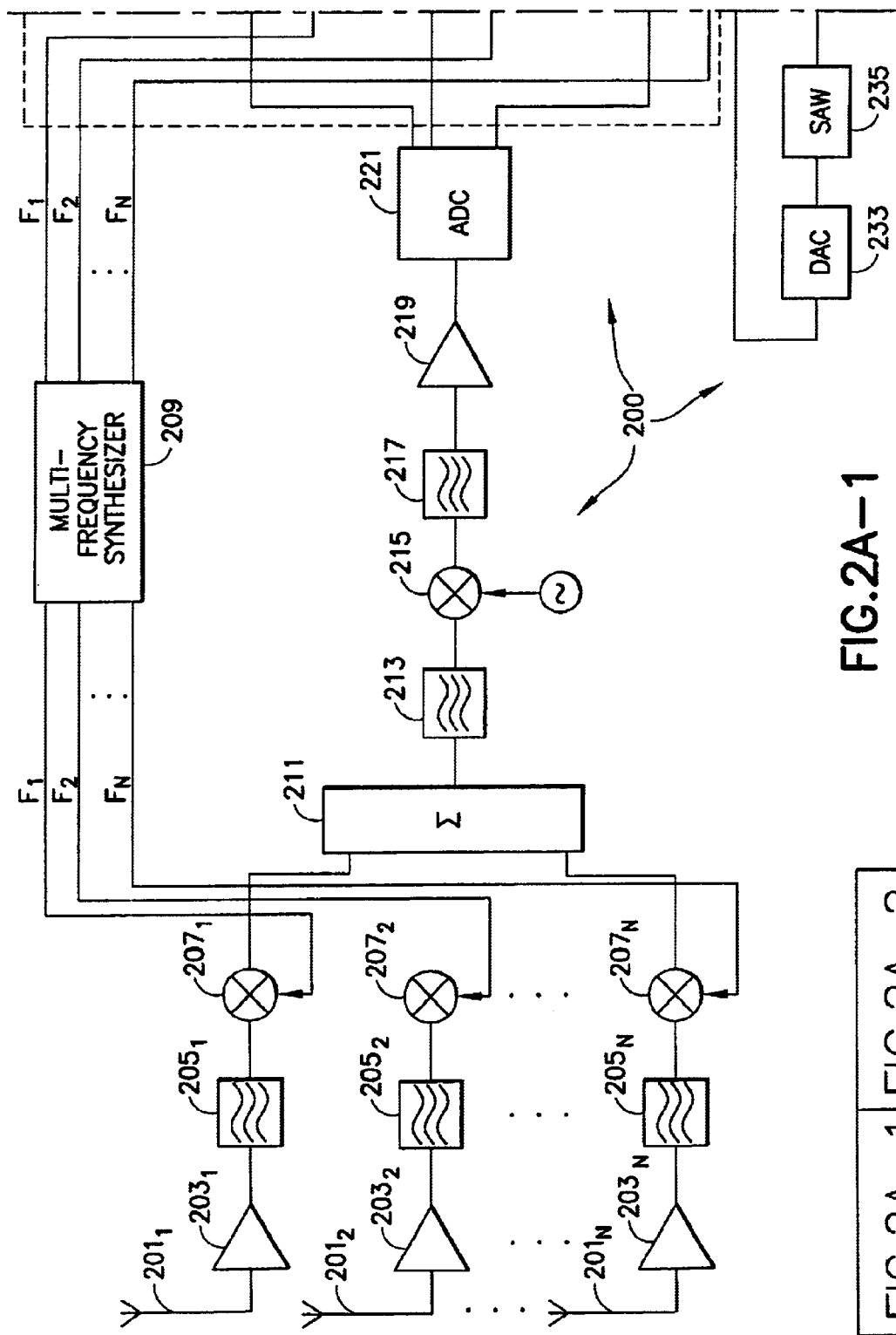

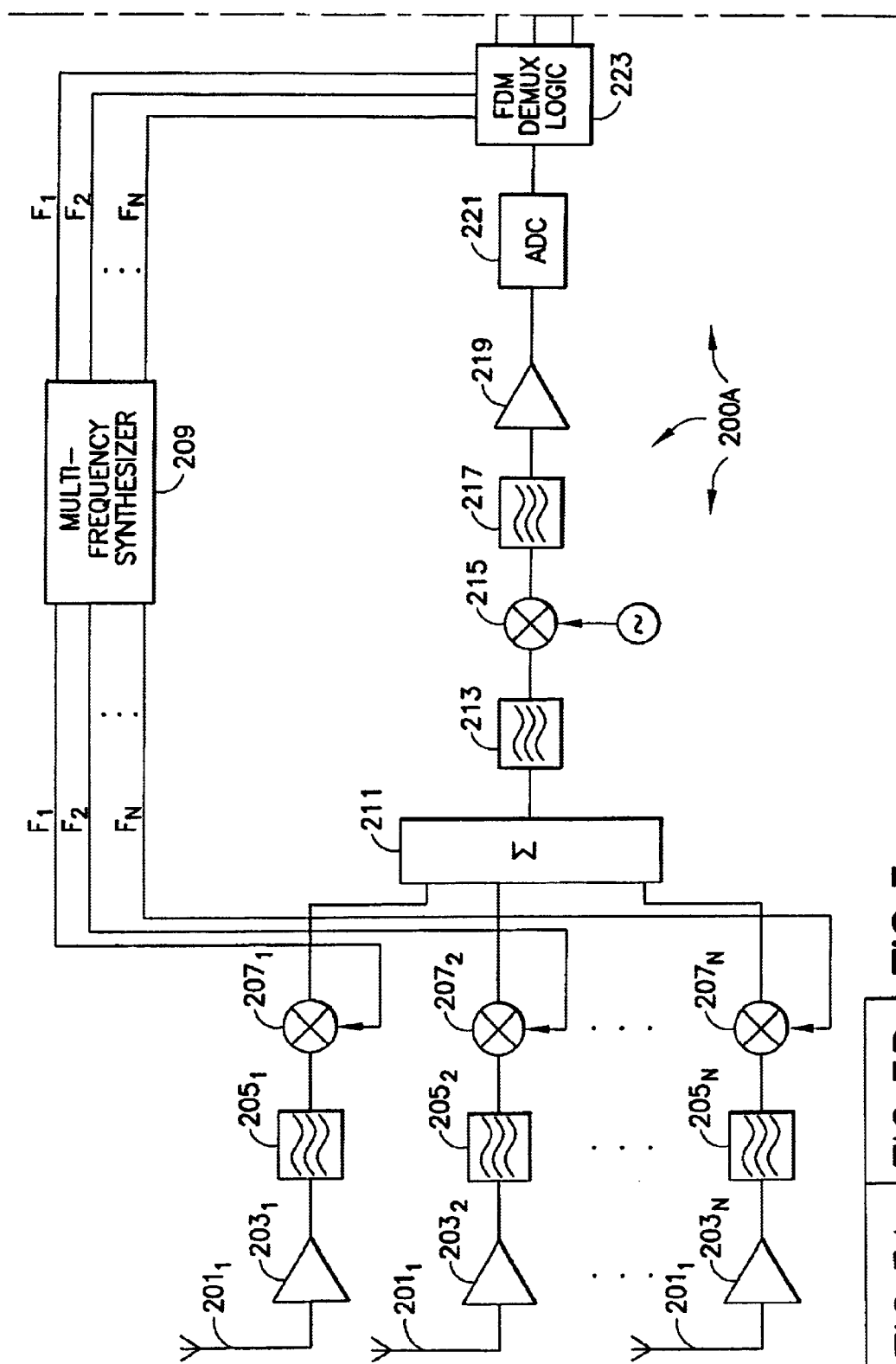

METHOD AND APPARATUS FOR GPS SIGNAL RECEIVING THAT EMPLOYS A FREQUENCY-DIVISION-MULTIPLEXED PHASED ARRAY COMMUNICATION MECHANISM

BACKGROUND OF THE INVENTION

1. Field of the Invention

This invention relates broadly to systems for receiving Global Positioning System (GPS) satellite signals, and more particularly, to GPS receiving systems employing a phased array communication mechanism.

2. State of the Art

GPS is a satellite navigation system funded by and controlled by the U.S. Department of Defense (DOD). While there are many thousands of civilian users of GPS worldwide, the system was designed for and is operated by the U.S. military. GPS provides specially coded satellite signals that can be processed in a GPS receiver, enabling the receiver to compute position, velocity and time. The Space Segment of the GPS system consists of a constellation of satellites that send radio signals from space. The nominal GPS Operational Constellation consists of twenty-four satellites that orbit the earth in twelve hours. There are often more than twenty-four operational satellites as new ones are launched to replace older satellites. The satellite orbits repeat almost the same ground track (as the earth turns beneath them) once each day. The orbit altitude is such that the satellites repeat the same track and configuration over any point approximately each twenty-four hours (four minutes earlier each day). There are six orbital planes (with nominally four satellites in each plane), equally spaced (sixty degrees apart), and inclined at about fifty-five degrees with respect to the equatorial plane. This constellation provides the user with between five and eight satellites visible from any point on the earth.

Each GPS satellite transmits a microwave signal L1 at a carrier frequency of 1575.42 MHz and a microwave signal L2 at a carrier frequency of 1227.60 MHz. The L1 signal and the L2 signal carry the GPS Navigation Message and binary codes, which shift the phase of the L1 and L2 signals. The binary codes of the L1 signal include a C/A Code (Coarse Acquisition code) and P Code (Precise code). The L2 signal includes only the P Code. The P Code is a repeating 10.23 MHz pseudo-random noise (PRN) sequence. The C/A code is a repeating 1.023 MHz PRN sequence. These noise-like codes provide spread-spectrum modulation of the L1 and L2 signals. The P code is intended for military use and is only available to authorized users. Civilian users access the GPS signals through the C/A code. There is a different C/A code PRN for each GPS satellite. GPS satellites are often identified by their PRN number, the unique identifier for C/A code PRN assigned thereto. The Navigation Message is a 50 Hz signal consisting of data bits that describe the GPS satellite orbits, clock corrections, and other system parameters. The GPS Navigation Message consists of time-tagged data bits. Such time-tagged data bits provided by multiple GPS satellites are used to determine latitude, longitude, height, velocity and the exact time. Position dimensions are computed by the receiver in Earth-Centered, Earth-Fixed X, Y, Z (ECEF XYZ) coordinates.

The GPS constellation's design insures that six to eleven satellites are in view from any point on the earth's surface at any given time. Because of the GPS signal design, two-dimensional and three-dimensional positions can be determined with the signals from just three and four satellites respectively. Accordingly, GPS receivers typically have the capability of automatically selecting three or four of the satellites in view based upon their received signal strength and Position Dilution of Precision (PDOP).

A number of undesirable interference sources (e.g., deliberate electronic countermeasures, RF electromagnetic pollution, clutter scatter returns and nature noise) can cause a GPS receiver to be ineffective or unreliable. Since GPS signals are very weak, they can be overcome by interference caused by even low power and low cost transmitters. When close to the interference source, GPS receivers are unable to track the satellite signals, and when further from the interference source, GPS receivers are able to track, but not acquire the GPS signals.

Phased array antenna systems have been predominantly used in military and aerospace applications because of their high implementation costs. In such systems, the signals received from a number of antenna elements are supplied to signal processing channels that provide a variable gain and variable phase shift to such signals. An antenna pattern for the combined receive signal can be formed by a set of specific gain values and phase shift values over the signal processing channels and a specific geometry and placement of the N antenna elements. The set of specific gain values and phase shift values is commonly referred to as "weights" (or "weight vector") for the phased array antenna system. A unique advantage of the phased array antenna system is that the antenna pattern can be adjusted by changing the "weights" as described above to perform one or both of the following operations:

a) beam steering: steering the beam by adjusting the phase shift values of the pattern for each processing channel; no adjustment to the gain values of the pattern is necessary.

b) antenna null: the phase shift values and gain values of the pattern are adjusted to the suppress signal (i.e., interference) from a specific direction.

U.S. Pat. No. 6,246,369 to Brown et al. describes a phased array antenna system for use in conjunction with a GPS receiver. The phased array antenna system nulls interference sources and/or applies gain through beam steering in the direction of the desired GPS signal sources. FIGS. 1A and 1B are block diagrams that illustrate this phased array antenna system, which includes a digital front end (DFE) unit 70, a digital beam steering (DBS) card 71 and a receiver processor board 72 that reside inside a personal computer 74 and that are controlled by a software program through the computer data bus. A plurality of DFE channels 63 within the DFE unit 70 convert the analog signals output from the antenna elements 18 to a digital sampled signal. Each of the DFE channels 63 operates from a common reference local oscillator (REF LO) 61 and a common sample clock 64 which is synchronized to the local oscillator 61. The outputs from the plurality of DFE channels 63 are passed to the DBS card 71 where the digital phase shifting is applied. The DBS card utilizes digital signal processing logic blocks 62 to apply complex weights to the input digital signals and form a digital summation to thereby provide composite complex digital output signals to a plurality of channels 73 of the receiver processor board 72.

The DSP logic blocks 62 operate under control of the personal computer 74 to provide the complex weights to adjust the antenna array pattern in order to track the GPS satellites as they move across the sky, to apply calibration corrections to compensate for offset between the individual antennas and the DFEs, or to apply nulling in the direction of the an interference source.

FIG. 1B illustrates the circuit components for each DFE channel 63 of the DFE unit 70, which operates to down-convert the GPS signals from radio frequency (RF) to intermediate frequency (IF) and to sample and convert the analog IF signal into a digital data stream. The GPS signals received at the antenna element 81 are passed through a low-noise amplifier 82, a ceramic filter 83 and another amplifier 84 for output to a mixer 85. The mixer 85 mixes this signal with coherent signals generated by a common local oscillator 61. The mixed and down-converted signals are then passed through a surface acoustic wave (SAW) filter 86 to form the IF signals. The IF signals are then passed through an amplifier 87 and an automatic gain control stage 88, which is operated under control of computer 74 to set the correct levels for analog-to-digital converter 89. The output of the A/D converter 89 is a sampled digital data stream that represents the digitized GPS data signals from each antenna element.

One of the drawbacks of this architecture is that it utilizes a large number of analog-to-digital converters 89 (e.g., one for each antenna element), which substantially increases the cost of the system. Another drawback is that the input signal level of the analog-to-digital converter 89 needs to be at a substantially higher level as compared to that of the received signal at the antenna element 81. Thus, the received signal needs to be amplified by one or more stages of amplifiers in order to bring the received signal to a level that the analog-to-digital converter 89 can operate properly. Such multistage amplification increases the cost of the system. Yet another drawback of this architecture is that is difficult to maintain the signal delays precisely through the DFE channels because the number of processing elements between the antenna element 81 and the analog-to-digital converter 89 is high. Such precise signal delays are required for accurate beam steering and nulling operations. Thus, calibration of these signal delays is required, which limits the suitability of this prior art phased array antenna system in many GPS applications that require limited maintenance by the end user.

GPS receivers also suffer from multipath errors which are caused by the receiver receiving a composite of the direct GPS signals and reflected GPS signals from nearby objects such as the ground or nearby buildings. Occurrence of such multipath errors is common within cities with high rise buildings—often referred to as an "urban canyon". Automobile manufacturers and their suppliers are one of the largest consumers of GPS receivers for in-vehicle navigation systems—and their use of such systems continues to grow. A typical GPS antenna can receive-both direct line of sight (LOS) signals and multipath signals. The direct line of sight (LOS) signal and the multipath signal are summed according to their relative phase and strength, resulting in a composite signal which has a timing epoch differing from that of the direct line of sight (LOS) signals. The GPS receiver is incapable of distinguishing and "rejecting" the reflected signal from the direct line of sight (LOS) signal unless the signal propagation delays of the two signals differ by at least half a chip duration (or 150,000 meters). In the "urban canyon", the direct line of sight (LOS) signal could be completely blocked by a building structure and a reflected signal could reach the receiver, resulting in a position and velocity error of significant magnitudes. The magnitude of the error depends in part on how far away the structure causing the signal reflection is.

In a paper by Brown entitled, "Multipath Rejection Through Spatial Processing," Proceedings of ION GSP 2000, Salt Lake City, Utah, September, 2000, the sampled digital data stream that is output by the digital-to-analog converter 89 of each DFE channel 64 of the phased array antenna of FIGS. 1A and 1B is processed to dynamically estimate the presence of multipath signal sources. Beam steering operations are used to provide antenna gain to reinforce direct signals and nulling operations are used to minimize the effect of received multipath signals. A maximum likelihood algorithm is used to implement the beam steering/multipath minimization operations on the digitized GPS data signals from each antenna element.

The drawbacks of the architecture of this phased array antenna system as described above also limit its suitability in addressing multipath rejection. More specifically, precise signal delays are required for accurate beam steering/nulling operations that are required for effective multipath rejection. Thus, calibration of these signal delays is required, which limits the suitability of this prior art phased array antenna system in many GPS applications that require limited maintenance by the end user. In addition, the maximum likelihood algorithm operates to select maximum signal power components, In some cases, such as when the direct path signal is blocked by a building, this may give erroneous results.

Thus, there remains a need in the art for improved phased array antenna systems for use in conjunction with a GPS receiver that are cost effective; that provide precise phase delay through the processing channels of the system for accurate beam steering/null operations that are required for effective multipath rejection; and that are suitable for applications that require limited maintenance by the end user.

SUMMARY OF THE INVENTION

It is therefore an object of the invention to provide an improved GPS antenna/signal receiver that employs a phased array antenna with precise phase delay through the processing channels of the antenna for accurate beam steering with minimal costs.

It is a further object of the invention to provide an improved GPS antenna/signal receiver that employs a phased array antenna with precise phase delay through the processing channels of the antenna and that is suitable for applications that require limited maintenance by the end user.

It is an additional object of the invention to provide an improved GPS antenna/signal receiver that employs a phased array antenna with a minimal number of signal processing elements in each processing channel prior to signal combination.

It is still another object of the invention to provide an improved GPS antenna/signal receiver that employs a phased array antenna with precise phase delay through the processing channels of the system for accurate beam steering utilizing simple and cost effective components.

In accord with these objects, which will be discussed in detail below, an improved GPS signal-receiver (and corresponding method of operation) includes a plurality of antenna elements each receiving, a plurality of GPS signals (e.g., GPS LI signals or GPS L2 signals). A plurality of mixers, which correspond to the array of antenna elements, cooperate with a combining node to convert the GPS signals received at the antenna elements in a frequency-division-multiplexed (FDM) manner over FDM frequency bands logically assigned to the antenna elements, to thereby produce a composite signal representing such GPS signals. An analog-to-digital converter converts an: analog signal derived from the combined signal (which may be an IF signal or baseband signal) into a digital word stream. Demultiplexing logic extracts GPS signal components in the digital word stream. The GPS signal components correspond to the FDM frequency bands logically assigned to the antenna elements. Beam forming logic, operably coupled to the demultiplexing logic, applies variable phase delay and variable gain to each GPS component in accordance with a set of weight values supplied thereto.

According to one embodiment of the present invention, the improved GPS signal receiver: (and corresponding method of operation) includes beam forming control logic that analyzes GPS signal components extracted by the demultiplexing logic to identify a given set of weight values that nulls at least one interfering signal, and that dynamically supplies the given set of weight values to the beam forming logic to null the interfering signal(s). Preferably, the given set of weight values are derived by identifying the direction of arrival for one or more interfering signals and generating the given set of weight values such that antennae nulls are provided for directions corresponding to the direction of arrival for the interfering signal(s). Advantageously, such processing provides for improved interference cancellation and multipath rejection.

In another embodiment of the present invention, the improved GPS signal receiver (and corresponding method of operation) includes beam forming control logic that estimates a pointing direction of a GPS satellite with respect to the GPS signal receiver and dynamically adjusts the beam steering direction (i.e., set of weight values supplied to the beam forming logic) in accordance with the estimated pointing direction. Preferably, the estimated pointing direction is based upon satellite position data provided by a GPS receiver, generated by scanning mode operations (that scan over a range of antenna pointing, directions to identify a pointing direction with maximum signal strength), or generated by tracking mode operations (that dither over a range of antenna pointing directions to identify a pointing direction with maximum signal strength). Such signal processing operations improve the overall signal to noise ratio of the GPS signals received by the system.

Additional objects and advantages of the invention will become apparent to those skilled in the art upon reference to the detailed description taken in conjunction with the provided figures.

BRIEF DESCRIPTION OF THE DRAWINGS

FIG. 1A is a block diagram of the functional elements of a prior art phased array antenna system;

DETAILED DESCRIPTION OF THE PREFERRED EMBODIMENTS

Figure 1B:
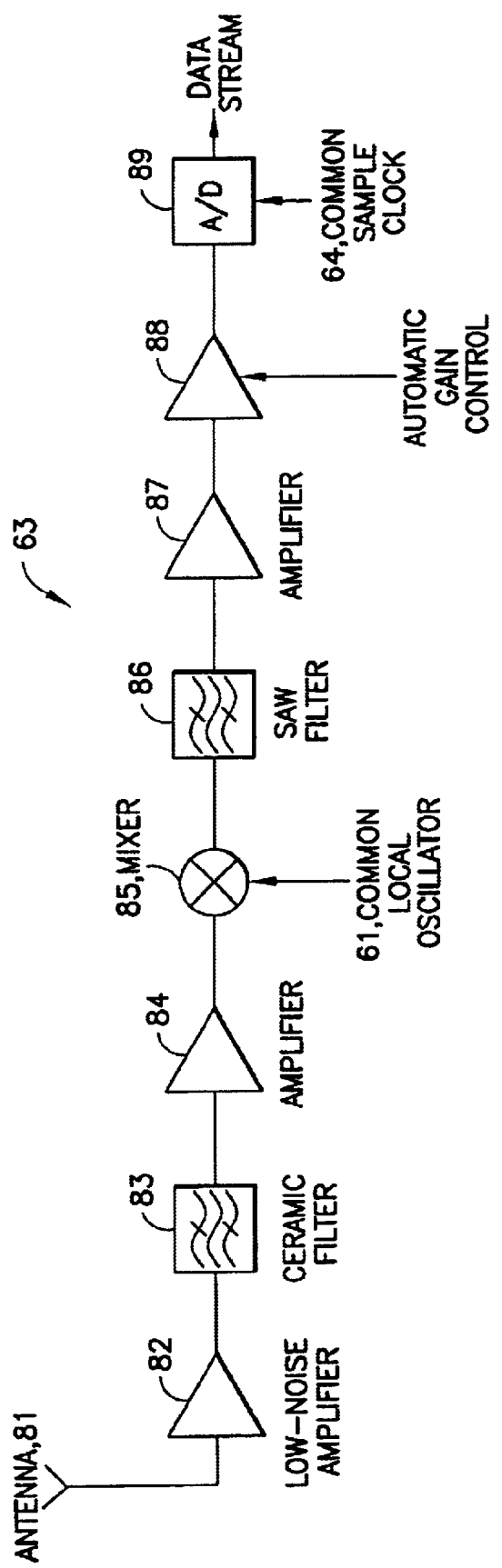
FIG. 1B is a schematic diagram of the functional elements of a DFE channel of the phased array antenna system of FIG. 1A.
Figures 2, 2A:
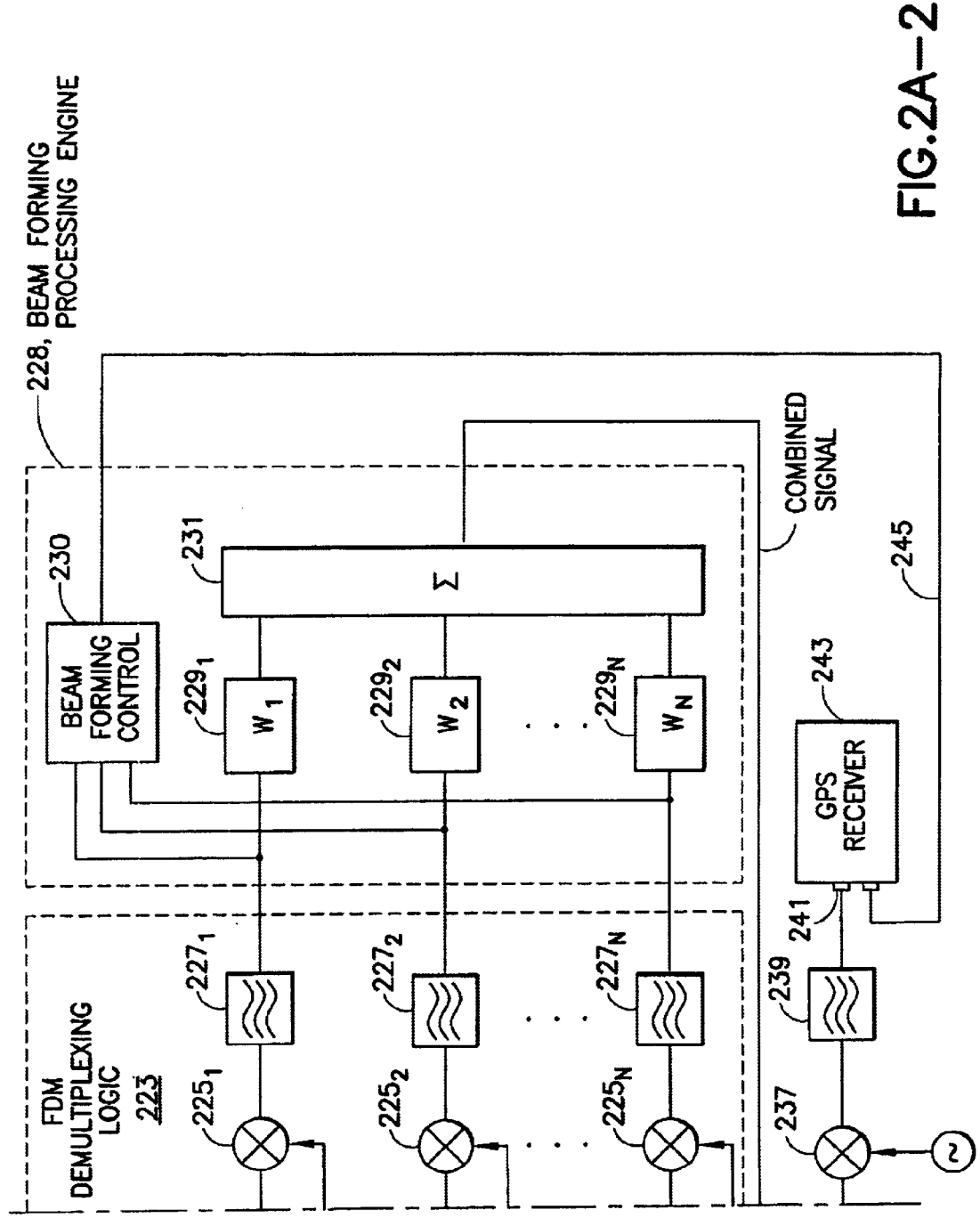
FIG. 2A is a block diagram of the functional elements of an improved phased array antenna system for use in conjunction with a GPS receiver in accordance with the present invention.
Figure 2B:
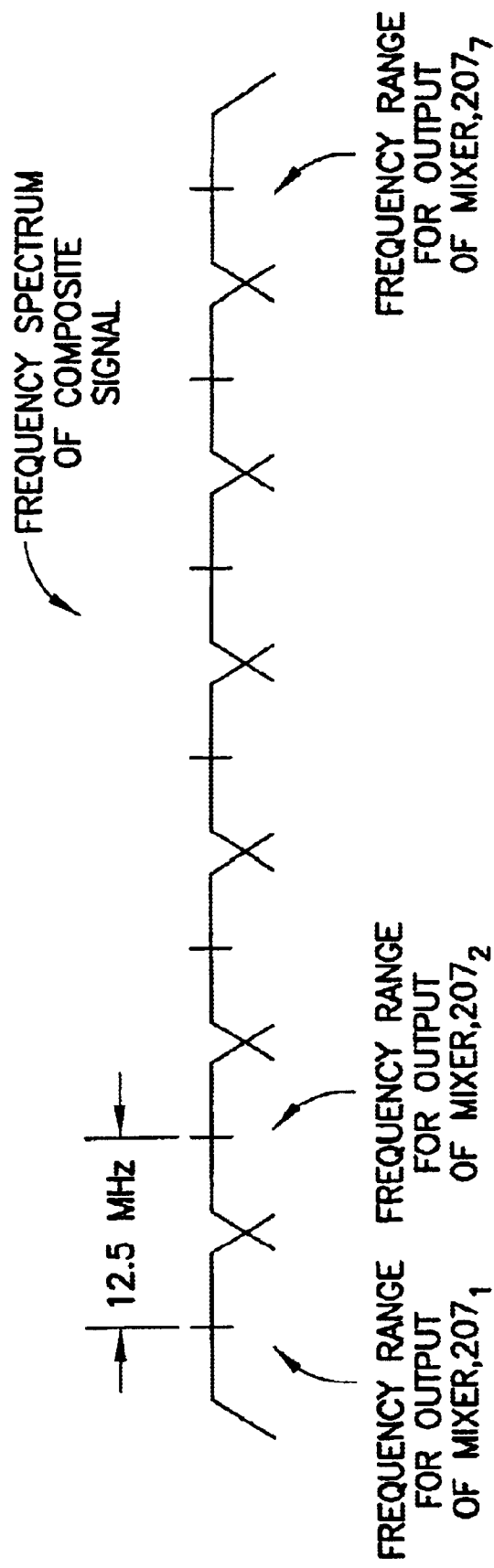
FIG. 2B is a diagram illustrating the signal components derived from the output of the N-antenna elements and combined in a frequency-division-multiplexed manner by the front-end signal processing circuitry of FIG. 2A.

Turning now to FIG. 2A, there is shown an improved phased array antenna system 200 for use in conjunction with a GPS receiver 243 in accordance with the present invention. The phased array antenna system 200 includes a number of antenna elements $201_1$, $201_2$, ... $201_N$ that receive microwave radiation including a plurality of GPS L1 signals (at a carrier frequency of 1575.42 MHz). The antenna elements $201_1$ ... $201_N$ may readily be adapted to receive a plurality of GPS L2 signals (at a carrier frequency of 1227.60 MHz). The signal from each antenna element is supplied to a number of components (referred to below as a front-end processing channel) that operate on the signal produced by the given antenna element as follows. In a given front-end processing channel x (where x identifies any one of the N front-end processing channels shown), the antenna signal is amplified (and possibly filtered) by a low noise amplifier $203_x$ and filtered by a bandpass filter $205_x$ to remove unwanted noise components therein. The width of the passband of bandpass filter $205_x$ is typically on the order of 10 MHz; however it is preferred that such passband width be as narrow as possible because the spacings between adjacent frequencies in the FDM composite signal (as described below and best shown in FIG. 2B) must be greater than the passband width of filter $205_x$. A mixer stage $207_x$ shifts the frequency of the signal output from the bandpass filter $205_x$ in accordance with an oscillating signal of frequency $F_x$ supplied by a multi-frequency signal source 209. The output of the mixer stages $207_1$, $207_2$, ... $207_N$ in the N front-end processing channels are combined at a combining node 211 to produce a composite signal. The frequencies $F_1$, $F_2$, ... $F_N$ of the oscillating signals supplied to the corresponding mixer stages $207_1$, $207_2$, ... $207_N$ are separated by a predetermined frequency range (for example, 12.5 MHZ) such that signals produced by the mixer stages $207_1$, $207_2$, ... $207_N$ are represented in a frequency-division-multiplexed manner in the composite signal as shown in FIG. 2B.

The composite signal is filtered by a bandpass filter 213 to remove unwanted noise components therein and then downconverted to a lower intermediate frequency (e.g., on the order of 70 MHz,) by downconverting mixer 215. The resultant signal is filtered by filter 217 (typically realized by a surface acoustic wave (SAW) type filter), amplified by amplifier 219, and then supplied to a high speed analog-to-digital converter 221.

In an alternate embodiment .(not shown), the downconverting mixer 215 may downconvert the composite signal to a baseband signal. In this configuration, the filter 217 can be a baseband low pass filter.

In yet another embodiment (not shown), the mixer stages $207_1$, $207_2$, ... $207_N$ may be adapted to downconvert the received signals for the respective antenna elements to corresponding baseband signals, which are combined by combiner 211 to form a baseband composite signal. In this configuration, the downconverting mixer 215 and filter 217 may be omitted such that the composite baseband signal produced by the amplifier 219 is supplied to the analog-to-digital converter 221 conversion into the digital domain.

The digital words output by the converter 221 are supplied to FDM demultiplexing logic 223. The FDM demultiplexing logic 223 and a beam forming processing engine 228 include a number of components (referred to below as a digital back-end processing channel) that operate on copies of the digital words output by the converter 221. In a given digital back-end processing channel y (where y identifies any one of the N back-end processing channels shown), the digital words supplied thereto are processed by FDM demultiplexing logic 223 (which correspond to antenna element $201_x$ and the mixer stage $207_x$ of the corresponding front-end processing channel) in accordance with a clock signal of frequency $F_y$ supplied thereto by multi-frequency synthesizer 209 to extract components in the digital words that correspond to the GPS signals received at the corresponding antenna element $201_x$. The frequencies $F_1, F_2 \ldots F_N$ of the clock signals supplied to the FDM demultiplexinq logic 223 for the digital back-end processing channels correspond to the frequencies supplied to the corresponding mixer stages $207_1, 207_2, \ldots 207_N$ of the front-end processing channels such that the FDM demultiplexing logic 223 of a given digital back-end processing channel recovers the GPS signals received at the corresponding antenna element $201_x$ in digital form. For example, oscillating signals at frequencies of 10 MHz, 20 MHz, 30 MHz . . . may be supplied to the mixer stages $207_1, 207_2, 207_3, \ldots$ of the front-end processing channels, and corresponding digital clock signals at the same frequencies are supplied to the FDM demultiplexing logic 223 for the digital back-end processing channels Such FDM demultiplexing logic 223 preferably includes a downconverting mixer logic block $225_y$ and a low pass filter logic block $227_y$ for each one of the N digital back-end processing channels as shown. The downconverting mixer block $225_y$ (which may be realized by an exclusive-or gate) and low pass filter logic $227_y$ operate in accordance with the corresponding frequency spacing employed by the FDM multiplexing operations performed by the front-end processing channels to recover the GPS signals received at a given antenna element in digital form. In this manner, the N downconverting mixer block $225_1 \ldots 225_N$ and corresponding N low pass filter logic blocks $227_1 \ldots 227_N$ generate N digital signals that represent the GPS signal components received at the corresponding antenna elements $201_1 \ldots 201_N$. The digital FDM demultiplexing logic 223 supplies the extracted GPS signal components to a beam forming processing engine 228.

In the alternate embodiments described above where the front-end frequency conversion operations produce a baseband signal for supply to the analog-to-digital converter 221, the FDM demultiplexing logic 223 for the digital back-end processing channels can be realized with a plurality of digital filters that recover the GPS signals received at the corresponding antenna element $201_x$ in digital form. In this configuration, the clocks signals $F_1 \ldots F_N$ supplied to the FDM demultiplexing logic 223 and the corresponding frequency downconverting mixer blocks $225_1 \ldots 225_N$ may be omitted.

The digital beam forming processing engine 228 applies a set of N complex weights $W_1 \ldots W_N$ to the signal components supplied thereto to impart a variable gain and a variable phase shift to these signal components over the N digital back-end processing channels, and adds the transformed signal components together to form a combined signal in digital form. In this manner, the antenna pattern is formed by the geometric arrangement of the antenna elements and the variable gain and variable phase delay over the digital back-end processing channels as controlled by the set of complex weights $W_1 \ldots W_N$.

Preferably, the digital beam forming processing engine 228 includes N digital complex multipliers $229_1 \ldots 229_N$ that multiply the N extracted signal components output by the FDM demultiplexing logic 223 with the set of N complex weights $W_1 \ldots W_N$ to adjust the gain and phase of these signal components over the N digital back-end processing channels. An adder 231 adds the signals output from the multipliers $229_1 \ldots 229_N$ to produce the combined signal in digital form. In addition, beam forming control circuitry 230 controllably adjusts the set of complex weights $W_1 \ldots W_N$ to change the antenna pattern to provide beam steering and nulling. Preferably, the FDM demultiplexing logic 223, the digital complex multipliers $229_1 \ldots 229_N$, and the adder 231 are realized by a field programmable gate array (FPGA), a complex programmable logic device (CPLD) or other programmable logic device. Alternatively, such functionality may be realized by an application specific integrated circuit (ASIC) or any other alternatives such as one or more digital signal processors (DSPs).

In the embodiment shown in FIG. 2A, the combined signal output by the beam forming processing engine 228 is converted to an analog signal by a digital-to-analog converter 233 and a surface acoustic wave (SAW) filter 235 (with a passband on the order of 2 MHz) and then upconverted to a 1575 MHz signal (corresponding to the frequency band of the GPS L1 signals) by upconverting mixer 237 and bandpass filter 239. The bandpass filter 239 operates to remove any unwanted harmonics in the signal produced by the mixer 237. The 1575 MHz signal output by the bandpass filter 239 is supplied to the input port 241 of a single channel GPS receiver 243 as shown.

In order to point the antenna beam toward a satellite, the satellite direction with respect to the antenna coordinate system needs to be calculated. For fixed-positions GPS applications, this information can be readily derived from GPS satellite location data, which is usually available from the GPS satellite broadcast and/or from a pre-stored database of satellite trajectories (utilizing current time). Preferably, the GPS receiver 243 provides such GPS satellite location data to the beam forming control circuitry 230 over a data path 245 coupled therebetween, and the beam forming control circuitry 230 calculates the satellite direction with respect to the antenna coordinate system utilizing the satellite location data supplied by the GPS receiver 243. For mobile GPS applications (such as automotive GPS applications and marine GPS applications), such computations require the attitude of the GPS receiver/antenna system. The attitude can be readily derived from the position and velocity of the antenna/GPS receiver system. Preferably, the position and velocity are calculated by the GPS receiver 243 utilizing the received GPS signals, and data representing the position and velocity are supplied by the GPS receiver 243 to the beam forming control circuitry 230 via data path 245. The beam forming control circuitry 230 computes the attitude of the receiver/antenna system utilizing the position and velocity data, and then calculates the satellite direction with respect to the local antenna coordinate system.

Figure 3B:
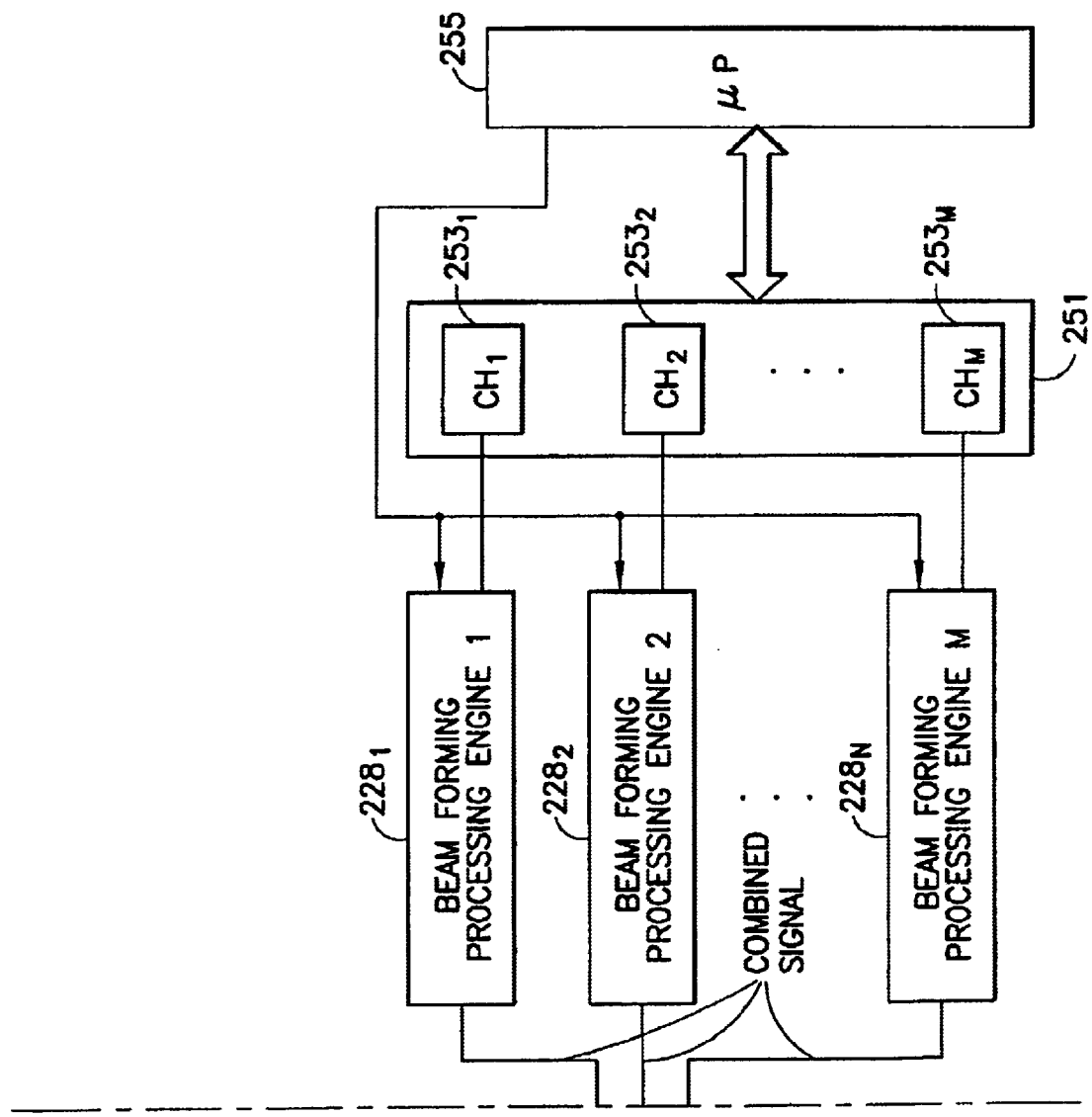
FIG. 3 is a block diagram of the functional elements of an improved phased array antenna system for use in conjunction with a multi-channel GPS signal correlator/receiver in accordance with the present invention.

FIG. 3 illustrates an alternate embodiment 200A with many of the same elements shown in the first embodiment of FIG. 2A. The phased array antenna system 200A includes multiple beam forming processing engines ($228_1 \ldots 228_M$), which process in parallel the N signal components extracted by the FDM demultiplexing logic 223 to thereby generate M combined signals. The M combined signals produced by the beam forming processing engines are supplied to a multi-channel correlator 251 with M dedicated correlators $253_1 \ldots 253_M$. Each correlator correlates the combined signal supplied thereto with an internally generated replica of satellite codes to be received to form accumulated data. The accumulated data is transferred to a microprocessor 255 for extraction of the navigation messages contained therein. The microprocessor 255 analyzes the navigation messages from a plurality of GPS satellites to calculate position coordinates and time, which is output therefrom for display or other subsequent processing.

Advantageously, the GPS antenna/receiver system of FIG. 3 provides beam forming network flexibility and distributes different digital signals to different correlators. For example, the M beam forming processing engines $228_1 \ldots 228_M$ and the corresponding correlators $253_1 \ldots 253_M$ can be uniquely assigned to receive the GPS L1 signal transmitted by M different GPS satellites. In this configuration, the beam forming engines are controlled to point towards different satellites. For fixed-positions GPS applications, this information can be readily derived from GPS satellite location data, which is usually available from the GPS satellite broadcast and/or from a pre-stored database of satellite trajectories (utilizing current time). Preferably, the microprocessor 255 provides the GPS satellite location data to the beam forming control circuitry 230 of the beam forming processing engines $228_1 \ldots 228_M$ over a data path 257 coupled therebetween, and the beam forming control circuitry 230 of each beam forming processing engine calculates the direction of the assigned satellite with respect to the antenna coordinate system utilizing the satellite location data supplied by the GPS receiver 243. For mobile GPS applications (such as automotive GPS applications and marine GPS applications), such computations require the attitude of the GPS receiver/antenna system. The attitude can be readily derived from the position and velocity of the antenna/GPS receiver system. Preferably, the position and velocity are calculated by the microprocessor 255 utilizing the received GPS signals, and data representing the position and velocity are supplied by the microprocessor 255 to the beam forming control circuitry 230 of the beam-forming processing engines $228_1 \ldots 228_M$ via data path 257. The beam forming control circuitry 230 computes the attitude of the receiver/antenna system utilizing the position and velocity data, and then calculates the satellite direction(s) with respect to the antenna coordinate system based upon the computed attitude.

In such mobile applications, when the antenna/GPS receiver system remain in a fixed position (e.g., the vehicle housing the antenna/GPS receiver system come to a stop), there is no accurate mechanism to compute velocity/attitude. In addition, in the event that the antenna/GPS receiver system makes a sharp change of direction, the computed velocity is typically inaccurate for a short period of time until the computations settle to reflect the new velocity. During this short period of time, the attitude computations that are derived from the velocity data are erroneous. In order to alleviate these problems, the beam forming processing engines of the phased array GPS antenna/receiving system of FIG. 3 as described above may be adapted to operate in a scanning mode and a tracking mode.

In the scanning mode, the pre-stored database of satellite trajectories and current time is used to estimate the direction (in the local antenna coordinate system) of the GPS satellites assigned to the beam forming processing engines $228_1 \ldots 228_M$. The beam forming processing engines $228_1 \ldots 228_M$ adjusts the weights of the respective back-end signal processing channels to effectuate beam steering toward the estimated direction of the GPS satellite uniquely assigned thereto. The signal-to-noise ratio from all the antenna beams (i.e., the combined signals output by the M beam forming processing engines $228_1 \ldots 228_M$) are computed and summed to form an overall signal strength indicator. Initially, the multiple antenna beams are simultaneously scanned (via adjusting the weights of the respective back-end signal processing channels) through the possible uncertainty region to find the point which provides the maximum signal strength. Preferably, while the antenna beams are scanned through the uncertainty region, their relative directions are maintained. This allows the phased array antenna to identify the optimal satellite signal and avoid multipath signals. This occurs because the relative direction of the direct-path signals are fixed, while the directions of multipath signals are random (depending on the structures which generate such signals via reflection). Once the direction of maximum signal strength is found, the system enters the tracking mode.

In the tracking mode, the beam forming processing engines $228_1 \ldots 228_M$ adjust the weights of the respective back-end signal processing channels to dither around the direction of maximum signal strength for the respective beam forming processing engines (as identified in the scanning mode). For example, such dithering may be accomplished by incrementally varying the direction of all the beams of the beam forming processing engines $228_1 \ldots 228_M$ to the left (up to a maximum angular variation such as 5 degrees), incrementally varying the direction of all the beams to the right (up to a maximum angular variation such as 5 degrees), incrementally varying the direction of all the beams in the up direction (up to a maximum angular variation such as 5 degrees), and then incrementally varying the direction of all the beams in the down direction (up to a maximum angular variation such as 5 degrees). During such dithering operations, the maximum received signal strength in the combined signal produced by each one of the beam forming processing engines $228_1 \ldots 228_M$ is identified. The pointing direction of the beam forming processing engines $228_1 \ldots 228_M$ are then updated (via adjusting the weights of the respective back-end signal processing channels) to correspond to the respective directions of maximum received signal strength.

As described above, the accuracy of a GPS receiver can be effected by two types of interference. The first one is the multipath signal due to the reflection and/or deflection of the environment. Multipath signals are a common problem when a GPS receiver operates in an urban area. The second one is the intentional and/or unintentional radiator located in the neighborhood of the GPS receiver or pointing toward the GPS receiver. The intentional radiator is also known as a jammer, which transmits an unknown signal using the same frequency as the GPS satellites. Unintentional radiators may be any kind of electronics, which leak power into the GPS operating frequency. A close-by intentional or unintentional radiator may cause a GPS receiver difficulty in acquiring, tracking and demodulating the signals sent by the GPS satellites.

In accordance with the present invention, the operations of the beam forming control circuitry 230 of the GPS antenna/receiver systems described above that identify the desired GPS satellite direction(s) with respect to the local antenna coordinate system, and direct the antenna pointing direction(s) toward the desired GPS satellite location(s) substantially eliminate the detrimental effects of multipath signals. Alternatively, the beam forming control circuitry 230 of the beam forming processing engine(s) 228 of the GPS antenna/receiver systems described above may be adapted to perform signal processing operations that estimate the presence of multipath sources and places nulls in the directions of observed multipath nulls.

Example of such signal processing operations are described in detail in Brown, "Multipath Rejection Through Spatial Processing," Proceedings of ION GSP 2000, Salt Lake City, Utah, September, 2000, incorporated by reference herein in its entirety. Such operations utilize a parametric approach to estimate the set of multipath signal sources based upon a cross-correlation matrix computed from calibration signals that observes the residual signal on each of the antenna elements after the best estimate of the direct GPS signal has been removed. The set of likely multipath signal sources are calculated as the set of values (( ) that minimize a particular equation.

The direction of the multipath signals is used to compute the optimal weights to direct the antenna pointing direction to the desired GPS satellite, and place a null on the estimated multipath signal directions. The weights required to minimize the antenna gain in the direction of the multipath signals and maximize the gain in the direction of the desired GPS satellite are then computed from certain equations.

Advantageously, such processing identifies the direction of arrival of multipath signals and generate antenna nulls against these multipath signals. Such operations substantially eliminate the detrimental effects of multipath signals, while maximizing the gain in the direction of the desired GPS satellite.

In accordance with the present invention, the beam forming control circuitry 230 of the GPS antenna/receiver systems described above may be adapted to perform signal processing operations that identify the direction of arrival of interference signals and generate antenna nulls against these interference signals. Such operations substantially eliminate the detrimental effects of interference signals, while maximizing the gain in the direction of the desired GPS satellite.

Figure 4:
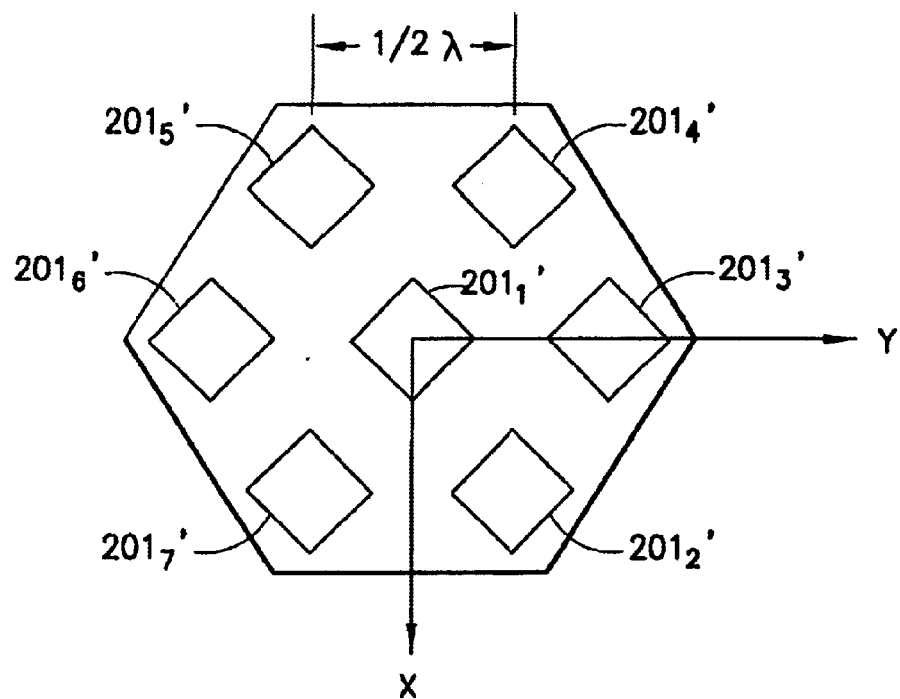
FIG. 4 is a plan view of an exemplary seven element patch antenna with a hexagonal arrangement for use in the improved phased array antenna systems of FIGS. 2 and 3 in accordance with the present invention.

Consider, for example, an exemplary GPS antenna/receiver system that utilizes multiple (e.g., seven) patch antenna elements spaced apart in a hexagonal grid arrangement as shown in FIG. 4. The centers of the antenna elements are spaced part by ½ wavelength of the signals to be received (e.g., for an GPS L1 signal, ½ wavelength is approximately 3.75 inches). In the seven element configuration shown, one element (201$_1$( )) is positioned at the; center of a hexagon and six elements (201$_2$( ) . . . 201$_7$( )) are positioned at the corners of the hexagon. The hexagonal grid arrangement is more efficient in terms of compactness as compared to a rectangular topology.

Figure 5:
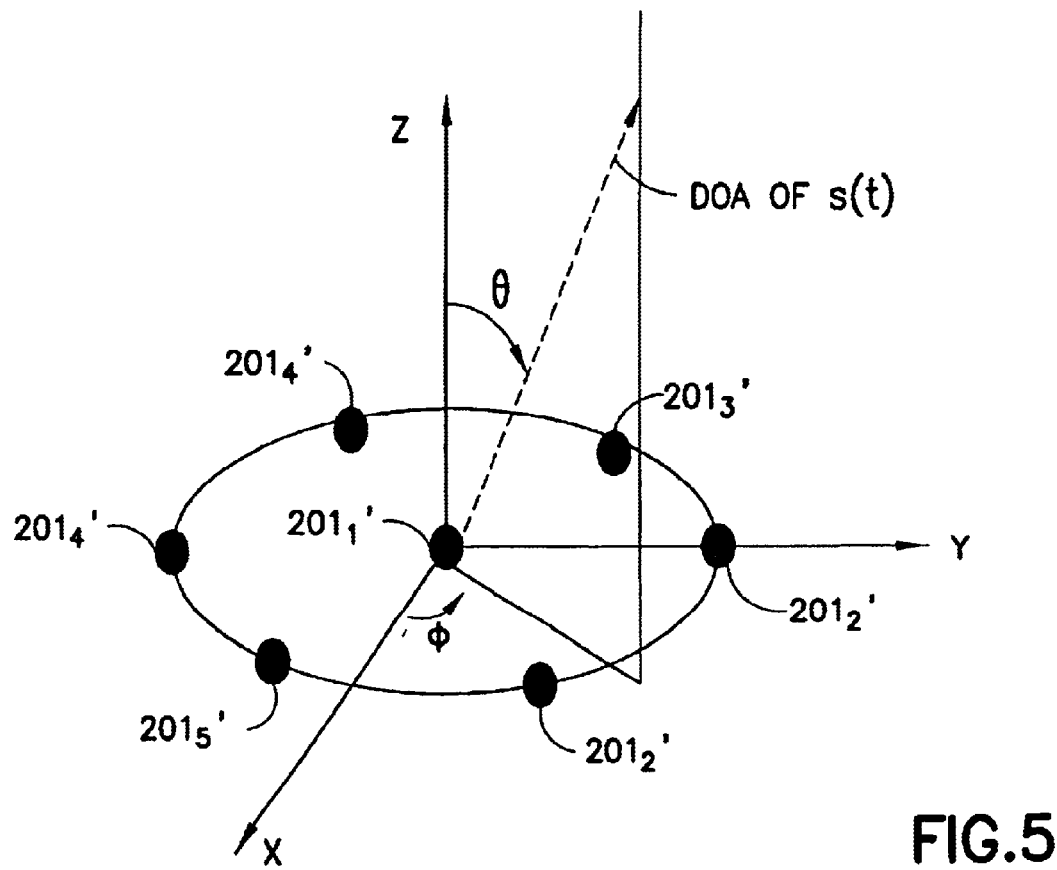
FIG. 5 is a pictorial illustration of a three-dimensional polar coordinate system depicting the location of the centers of the seven patch antenna elements of FIG. 4 and the direction of arrival of a representative received signal.

FIG. 5 illustrates a three-dimensional polar coordinate system for the phased array antenna system depicting the location of the centers of the seven patch antenna elements of FIG. 4 and the direction of arrival of a representative received signal s(t) that passes through the origin of the antenna coordinate system.

In this configuration, for the received signal s(t), the combined signal r(t) produced by the 7-component antenna is:

$$r(t) = w_0 s(t) + s(t) \cdot \sum_{k=1}^{6} w_i \cdot e^{-j\frac{2\pi R}{\lambda} \cos(\phi - \phi_k) \sin\theta} \quad (1)$$

where R is the distance between two antenna components, $\lambda$ is the-wavelength of the GPS signal, $(\phi,\theta)$ is the direction of the received signal s(t), $\phi_k$ is the azimuth angular position of the $k^{th}$ antenna component, $w_o$ is the complex weight vector for the antenna component located at the origin of the antenna coordinate system local, $w_k$ is the complex weight vector for the $k^{th}$ antenna component (of the six antenna components) disposed about the center antenna component.

The steering vector from angle $(\phi,\theta)$ and the weight vector can be expressed as:

$$a(\phi, \theta) = \begin{bmatrix} 1 \\ e^{-j\frac{2\pi R}{\lambda}\cos(\phi-\phi_i)\sin\theta} \\ \vdots \\ e^{-j\frac{2\pi R}{\lambda}\cos(\phi-\phi_0)\sin\theta} \end{bmatrix} \quad w = \begin{bmatrix} w_0 \\ w_1 \\ \vdots \\ w_6 \end{bmatrix} \quad (2)$$

so that, $$r(t) = s(t) w^T a(\phi,\theta) \quad (3)$$

In other words, if there are D signals (i=0, . . . ,(D−1)) coming from D directions $(\phi_i,\theta_i)$, the received signal $u_i(t)$ at each antenna component can be put in a vector format as:

$$u_i(t) = a(\phi_i,\theta_i) s_i(t) \quad (4)$$

The received input data vector at an N-element array u(t), which is derived from the corresponding N digital data signals output by the FDM demultiplexing logic 223, can be expressed as a linear combination of the D incident waveforms and noise. That is, $$u(t) = \sum_{i=0}^{D-1} a(\phi_i, \theta_i) \cdot s_i(t) + n(t) \quad (5a)$$

$$u(t) = [a(\phi_0, \theta_0) a(\phi_1, \theta_1) \ldots a(\phi_{D-1}, \theta_{D-1})] \cdot \begin{bmatrix} s_0(t) \\ s_1(t) \\ \vdots \\ s_{D-1}(t) \end{bmatrix} + n(t) \quad (5b)$$

$$= A \cdot s(t) + n(t) \quad (5c)$$

where $s^T(t) = [s_0(t), s_1(t), \ldots s_{D-1}(t)]$ is the vector of incident signals, $n^T(t) = [n_0(t), n_1(t), \ldots, n_{D-1}(t)]$ is the noise vector, $a(\phi_i,\theta_i)$ is the steering vector corresponding to direction-of-arrival (DOA) of the $i^{th}$ signal, and A is the array of steering vectors.

For simplicity of description, the time argument will be dropped from u, s, and n in the description forward.

In geometric terms, the received vector u and the steering vectors $a(\phi_i,\theta_i)$ can be visualized as vectors in N dimensional space. The input covariance matrix $R_{uu}$ can be expressed as:

$$R_{uu} = E[u \, u^H] = A \, E[s \, s^H] A^H + E[n \, n^H] \quad (6a)$$

$$R_{uu} = A \, R_{ss} A^H + \sigma^2_n I \quad (6b)$$

where $R_{ss}$ is the signal correlation matrix $E[s \, s^H]$.

The eigenvalues of $R_{uu}$ are the values, $\{\lambda_0, \ldots, \lambda_{N-1}\}$ such that:

$$|R_{uu} - \lambda_i I| 0 \quad (7)$$

This can be rewritten as:

$$|A \, R_{ss} A^H + \sigma^2_n I - \lambda_i I| = |A \, R_{ss} A^H - (\lambda_i - \sigma^2_n) I| = 0 \quad (8)$$

Therefore the eigenvalues, $v_i$, of $A \, R_{ss} A^H$ are:

$$v_i = \lambda_i - \sigma^2_n \quad (9)$$

Since A is composed of steering vectors which are linearly independent, it has full column rank, and the signal correlation matrix $R_{ss}$ is nonsingular as long as the incident signals are not highly correlated.

A full column rank A and nonsingular $R_{ss}$ guarantees that when the number of incident signals D is less than the number of array elements N, the N×N matrix $A R_{ss} A_H$ is positive semi-definite with rank D. This implies that (N–D) of the eigenvalues, $v_i$, of $A R_{ss} A^H$ are zero. This means that (N–D) of the eigenvalues of $R_{uu}$ are equal to the noise variance $\sigma^2_n$. The eigenvalues of $R_{uu}$ are sorted such that $\lambda_0$ is the largest eigenvalue, and $\lambda_{N-1}$ is the smallest eigenvalue. Therefore, $$\lambda_D, \lambda_{D+1}, \ldots, \lambda_M = \sigma^2_n \quad (10)$$

In practice, when the autocorrelation matrix $R_{uu}$ is estimated from a finite data sample, all the eigenvalues corresponding to the noise power will not be identical. Instead they will appear as a closely spaced cluster, with the variance of their spread decreasing as the number of samples used to obtain an estimate of $R_{uu}$ is increased. Once the multiplicity, K, of the smallest eigenvalue is determined, an estimate of the number of signals, D, can be obtained from the relation N=(D+K). Therefore, the estimated number of signals is given by $$D = (N-K) \quad (11)$$

The eigenvector associated with a particular eigenvalue, $\lambda_i$, is the vector $q_i$ such that $$(R_{uu} - \lambda_i I) q_i = 0 \quad (12)$$

For eigenvectors associated with the (N–D) smallest eigenvalues:

$$(R_{uu} - \lambda_i I) q_i = A R_{ss} A^H q_i = 0 \quad (13)$$

Since A has full rank and $R_{ss}$ is nonsingular, this implies that $$A^H q_i = 0 \quad (14)$$

This means that the eigenvectors associated with the (N–D) smallest eigenvalues are orthogonal to the D steering vectors that make up A, which can be expressed as follows:

$$\{a(\phi_0, \theta_0), \ldots, a(\phi_{D-1}, \theta_{D-1})\} \perp \{q_D, \ldots, q_{N-1}\} \quad (15)$$

This is an important observation because it enables estimation of the steering vectors-associated with the received signals by finding the-steering vectors which are most nearly orthogonal to the eigenvectors associated the eigenvalues of $R_{uu}$ that are approximately equal to $\sigma^2_n$.

The above derivation shows that the eigenvalues of the covariance matrix $R_{uu}$ belong to either of the two orthogonal subspaces, called the principal eigen subspace {signal subspace} and the non-principal eigen subspace {noise subspace}. The steering vectors corresponding to the directions-of-arrival (DOAs) lie in the signal subspace and are hence orthogonal to the noise subspace. By searching through all possible array steering vectors to find those which are perpendicular to the space spanned by the non-principal eigenvectors, the DOAs ($\phi_i, \theta_i$) can be determined.

To search through the noise space, a matrix containing the noise eigenvectors is formed as follows:

$$V_n = [q_D, \ldots, q_{N-1}] \quad (16)$$

Since the steering vectors corresponding to signal components are orthogonal to the noise subspace eigenvectors, $a^H(\phi, \theta) V_n V_n^H a(\phi, \theta) = 0$ for $\phi$ and $\theta$ corresponding to the DOA of a multipath component. The DOAs of the multiple incident signals can be estimated by locating the peaks of a spatial spectrum $P(\phi, \theta)$ given by $$P(\phi, \theta) = \frac{1}{a^H(\phi, \theta) V_n V_n^H a(\phi, \theta)} \quad (17)$$

Or, equivalently $$P(\phi, \theta) = \frac{a^H(\phi, \theta) \cdot a(\phi, \theta)}{a^H(\phi, \theta) V_n V_n^H a(\phi, \theta)} \quad (18)$$

Orthogonality between $a(\phi, \theta)$ and $V_n$ will minimize the denominator and hence will give rise to peaks in the spatial spectrum $P(\phi, \theta)$. The D largest peaks in the spatial spectrum correspond to the directions of arrivals ($\phi_i, \theta_i$) of the signals impinging on the array.

Once the Directions of arrivals ($\phi_i, \theta_i$) are determined from the D largest peaks in the spatial spectrum $P(\phi, \theta)$, the signal covariance matrix $R_{ss}$ can be determined form the following relation $$R_{ss} = (A^H A)^{-1} A^H (R_{uu} - \lambda_{min} I) A (A^H A)^{-1} \quad (19)$$

The powers and cross correlations between the various input signals can be readily obtained.

If D (e.g., the number of peaks in the spatial spectrum $P(\phi, \theta)$) is found to be greater than zero, it means high power intentional/unintentional radiator(s) are detected. The signal processing will try to eliminate the interference signal by producing D antenna nulls toward the interferer's DOAs. This can be achieved by restricting the steering vectors to the noise space so that they are orthogonal to the directions that high power signals are coming from. The set of steering vectors $\{q_D, \ldots, q_{N-1}\}$ can thus be used to construct an antenna pattern which produces the nulls in the interferer's DOAs.

The signal processing operations described above enables the DOAs of impinging signals to be found precisely under the conditions of uncorrelated signals and identical noise conditions. When the impinging signals $s_i(t)$ are highly correlated (such as multipath signals), the signal processing operations described above fails because $R_{ss}$ becomes singular. This is the case when the passed-array antenna is surrounded by closed-in structures, which can create multipath.

Further signal processing operations may be performed to optimize the weight vector in accordance with D antenna nulls toward the interferer's DOAS. More specifically, since $\{a(\phi_0, \theta_0), \ldots, a(\phi_{D-1}, \theta_{D-1})\} \perp \{q_D, \ldots, q_{N-1}\}$, the antenna pattern shows nulls at $\{(\phi_0, \theta_0), (\phi_1, \theta_1), \ldots, (\phi_{D-1}, \theta_{D-1})\}$ if the array weighting vector is designed in the noise space n=space$\{q_D, \ldots, q_{N-1}\}$. In other words, $$|G(\phi,\theta)|_{(\phi,\theta)=(\phi_0,\theta_0),\ldots(\phi_{D-1},\theta_{D-1})} =$$
$$|w^H a(\phi,\theta)|_{(\phi,\theta)=(\phi_0,\theta_0),\ldots(\phi_{D-1},\theta_{D-1})} = 0 \text{ if } w \in n \text{ or}$$
$$w = b^H V_n = \Sigma_{i=D,N-1} b_i q_i \text{ where } |b| = 1 \quad (20)$$

For an N-component array antenna, it is thus possible to place (N–1) nulls in the directions of unwanted incoming signals.

If (N–D) >=1, the noise space has an extra dimension of freedom. It is further possible to optimize the weighting vector w so that the antenna pattern shows a maximum gain in a given direction (e.g., the estimated direction of the GPS satellite or direction of maximum signal strength). More specifically, consider a desired signal coming from a direction $(\phi_{MAX}, \theta_{MAX})$. The antenna gain function $|G(\phi,\theta)|_{(\phi,\theta)\ldots(\phi max, \theta max)}$ can be optimized through a complex unit vector b. This can be done by taking a derivative of $|G(\phi,\theta)|$ and letting it be zero at $(\phi,\theta)=(\phi_{MAX}, \theta_{MAX})$ and solving for b.

$$\frac{\partial}{\partial \phi} \|G(\phi, \theta)\|_{(\phi,\theta)(\phi_{MAX}, \theta_{MAX})} = \quad (21a)$$

$$\frac{\partial}{\partial \phi} |(b^H V_n)^H a(\phi, \theta)|_{(\phi,\theta)(\phi_{MAX}, \theta_{MAX})} = 0$$

$$\frac{\partial}{\partial \theta} \|G(\phi, \theta)\|_{(\phi,\theta)(\phi_{MAX}, \theta_{MAX})} = \quad (21b)$$

$$\frac{\partial}{\partial \theta} |(b^H V_n)^H a(\phi, \theta)|_{(\phi,\theta)(\phi_{MAX}, \theta_{MAX})} = 0$$

Alternatively, an orthogonal unit vector set $\{e_D, \ldots, e_{M-1}\}$ can be derived that spans the noise space using the procedure below:

$$e_D = q_D / |q_D| \quad (22a)$$

$$e_{D+1} = [q_{D+1} - (q_{D+1}{}^H e_D) e_D] / |q_{D+1} - (q_{D+1}{}^H e_D) e_D| \quad (22b)$$

$$e_{D+2} = [q_{D+2} - (q_{D+2}{}^H e_D) e_D - (q_{D+2}{}^H e_D) e_D] / [|q_{D+2} - (q_{D+2}{}^H e_D) e_D - (q_{D+2}{}^H e_{D+1}) e_{D+1}|] \quad (22c)$$

The vector set $U_n$ is defined as $[e_D, \ldots, e_{N-1}]$ and the weighting vector can be expressed as $$w = b^H V_n = c^H U_n \quad (23)$$

The vector c can be obtained by projecting $a(\phi_{MAX})$ to the noise space, i.e., $$c = a(\phi_{MAX}, \theta_{MAX})^H U_n \quad (24)$$

Then, the unique vector w in the noise space N that has maximum inner product with $a(\phi_{MAX}, \theta_{MAX})$ can be obtained by $$w = c^H U^n \quad (25)$$

This weight vector provides an antenna pattern that maximizes the antenna gain toward the desired direction $(\phi_{MAX}, \theta_{MAX})$ while nulling the interference.

Note that if D (e.g., the number of peaks in the spatial spectrum $P(\phi,\theta)$) is found to be zero, it indicates that no significant interference power has been detected. Since no antenna null is needed, the beam-forming algorithm changes its strategy from interference nulling into satellite signal optimization as described above.

A typical (non-phased-array) GPS antenna can receive both direct-path signal and multipath signals due to reflection. The direct-path signal and multipath signals are summed up with different phases and amplitudes, resulting in a composite signal which has a timing epoch differing from that of the original direct-path signal. Without a phased-array antenna, the GPS receiver is incapable of distinguishing and rejecting the multipath signals from the direct-path signal unless the signal propagation delays of the two signals differ by at least half a chip duration (or 150,000 meters). This results in inaccurate position and velocity estimates. In the "urban canyon" environment, the direct-path signal could be blocked completely by a building structure while the reflected signals could still reach the receiver, resulting in position and velocity errors of significant magnitudes. The magnitude of the position and velocity errors depend in part on the distance that the GPS signal is reflected.

The improved GPS antenna/receiver of the present invention can provide a dedicated antenna beam for each GPS satellite in sight. In addition, the improved GPS antenna/receiver of the present invention can generate a dedicated antenna beam with a higher gain pointing toward the satellite direction to receive a direct-path GPS signal and suppress the reflected signals via lower gain (off main beam width) beams or antenna nulls. This technique is effective against reflected signals from both close-by structures as well as far away structures as long as the direction of arrivals of the direct-path GPS signal and the reflected signal are substantially different. In the urban environment, these signals are most likely coming from significantly different directions. Some reflected signals could come from the same direction as the direct-path signal. However, these reflected signals are most likely bounced from more than a single structure and therefore are significantly weaker (each time a signal is reflected, its power is reduced significantly). The signal received from the dedicated antenna beam is routed to a dedicated receiver (correlator) for further processing.

The improved GPS antenna/receiver of the present invention also utilizes FDM operations (in the analog domain) on the output of the antenna elements to produce a composite signal, high speed analog-to-digital conversion of a signal derived from the composite signal, and FDM demultiplexing operations (in the digital domain) to produce digital signals that represent the GPS signal components received at the corresponding antenna elements. Advantageously, such processing utilizes a single high speed digital-to-analog converter, which substantially decreases the cost of the system. In addition, because signal combination occurs very close to the antenna elements, many of the problems of the prior art architectures that stem from variations in signal delay through each processing channel are avoided. Thus, calibration of these signal delays is not required. This enables the improved GPS antenna/receiver of the present invention to be used for many GPS applications that require limited maintenance by the end user.

There have been described and illustrated herein several embodiments of improved GPS antenna/receiver systems that utilize frequency-division-multiplexing and digital demultiplexing along with adaptive digital beam forming for improved interference cancellation, multipath rejection and improved signal reception. While particular embodiments of the invention have been described, it is not intended that the invention be limited thereto, as it is intended that the invention be as broad in scope as the art will allow and that the specification be read likewise. Moreover, while particular configurations have been disclosed in reference to digital broadcast satellite DBS systems, it will be appreciated that other configurations could be used as well. It will therefore be appreciated by those skilled in the art that yet other modifications could be made to the provided invention without deviating from its spirit and scope as claimed.

What is claimed is:

1. A global positioning system (GPS) signal receiver comprising:
   a) a plurality of antenna elements each receiving a plurality of GPS signals, each GPS signal comprising a baseband signal modulated onto a carrier signal within a predetermined first frequency band;
   b) a plurality of mixers corresponding to said array of antenna elements, said mixers converting said GPS signals received at said antenna elements in a frequency-division-multiplexed manner to produce GPS signals within a set of second frequency bands that correspond to said antenna elements, wherein successive bands in said set of second frequency bands are separated from each other;

c) a combiner node that combines output of each mixer to produce a composite signal;

d) an analog-to-digital converter that converts an analog signal derived from said composite signal into a digital word stream;

e) demultiplexing logic that extracts components of said digital word stream, said components corresponding to said set of second frequency bands and said antenna elements; and f) beam forming logic, operably coupled to said demultiplexing logic, that applies variable phase delay and variable gain to each component in accordance with a set of weight values supplied thereto.

2. A GPS signal receiver according to claim 1, further comprising:

g) beam forming control logic that analyzes said components extracted by said demultiplexing logic to identify a given set of weight values that nulls at least one interfering signal, and dynamically supplies said given set of weight values to said beam forming logic to null said at least one interfering signal.

3. A GPS signal receiver according to claim 2, wherein:

said beam forming control logic identifies a direction of arrival for each one of said interfering signals and generates said given set of weight values such that antennae nulls are provided for directions corresponding to said direction of arrival for said interfering signals.

4. A GPS-signal receiver according to claim 3, wherein:

said beam forming control logic generates said given set of weight values by
   i) calculating a set of eigenvectors of a covariance matrix derived from said components;
   ii) defining a spatial spectrum based upon said set of eigenvectors;
   iii) locating peaks in said spatial spectrum; and
   iv) calculating said given set of weight values based upon location of said peaks in said spatial spectrum, to thereby provide nulls in the direction of unwanted GPS signals and gain in the direction of direct line of sight GPS signals.

5. A GPS signal receiver according to claim 1, wherein:

each mixer comprises a series of stages including an amplifier stage, bandpass filter stage and frequency shifting mixer stage.

6. A GPS signal receiver according to claim 1, wherein:

said analog signal derived from said composite signal comprises one of an intermediate frequency signal and a baseband signal.

7. A GPS signal receiver according to claim 6, wherein:

said intermediate frequency signal is produced by down-conversion circuitry including a first bandpass filter stage, a downconverting mixer stage, a second bandpass filter stage, and an amplifier stage.

8. A GPS signal receiver according to claim 1, wherein:

said demultiplexing logic includes a downconverting mixer logic block and low pass filter logic block corresponding to each mixer and antenna element.

9. A GPS signal receiver according to claim 1, wherein:

said beam forming logic comprises a complex digital multiplier that multiplies data output by said demultiplexing logic and a vector component supplied thereto.

10. A GPS signal receiver according to claim 1, wherein:

said plurality of antenna elements comprises a plurality of patch antenna elements spatially arranged in a hexagonal pattern.

11. A GPS signal receiver according to claim 8, wherein:

centers of said patch antenna elements are spaced apart by a ½ wavelength of said GPS signals.

12. A GPS signal receiver according to claim 1, wherein:

said plurality of mixers generates signals within successive bands in said second set of frequency bands, each successive band pair having center frequencies separated by 12.5 MHz.

13. A GPS signal receiver according to claim 1, further comprising:

summation logic that sums output of said beam forming logic;

digital-to-analog conversion circuitry that converts output of said summation logic into an analog signal; and modulation circuitry that modulates said analog signal onto a carrier signal within said first predetermined frequency band for output to a GPS receiver.

14. A GPS signal receiver according to claim 13, wherein:

said modulation circuitry comprises a series of stages including a SAW filter stage, upconverting mixer stage, and bandpass filter stage.

15. A GPS signal receiver according to claim 1, further comprising:

a multi-channel GPS correlator circuitry and microprocessor, operably coupled to output of said beam forming logic, wherein said multi-channel GPS correlator correlates the digital signals output by said multiplier logic with an internally generated replica of satellite codes to be received to form accumulated data, wherein said accumulated data is transferred to said microprocessor for extraction of the navigation messages contained therein and analysis of said navigation messages from a plurality of GPS satellites to calculate position coordinates and time for output therefrom.

16. A GPS signal receiver according to claim 2, wherein:

said beam forming control logic identifies an estimated pointing direction of a GPS satellite with respect to said GPS signal receiver and adjusts said given set of weight values in accordance with said estimated pointing direction.

17. A GPS signal receiver according to claim 16, wherein:

said beam forming control logic is adapted to perform a scanning mode that scans over a range of antenna pointing directions to identify a pointing direction with maximum signal strength.

18. A GPS signal receiver according to claim 16, wherein:

said beam forming control logic is adapted to perform a tracking mode that dithers over a range of antenna pointing directions to identify a pointing direction with maximum signal strength.

19. A method for receiving a plurality of global position satellite (GPS) signals, each GPS signal comprising a baseband signal modulated onto a carrier signal within a predetermined first frequency band, the method comprising the steps of:

a) providing a plurality of antenna elements that receive said plurality of GPS signals;

b) converting GPS signals received at said antenna elements in a frequency-division-multiplexed manner to produce GPS signals within a set of second frequency bands that correspond to said antenna elements, wherein successive bands in said set of second frequency bands are separated from each other;

c) combining said GPS signals within said second set of frequency bands to produce a composite signal;

d) converting an analog signal derived from said composite signal into a digital word stream;

e) extracting GPS signal components of said digital word stream, said GPS signal components corresponding to said set of second frequency bands and said antenna elements; and f) applying variable phase delay and variable gain to each GPS signal component in accordance with a set of weight values supplied thereto.

20. A method for receiving a plurality of GPS signals according to claim 19, further comprising the step of:

g) analyzing said GPS signal components to identify a given set of weight values that nulls at least one interfering signal, and dynamically updating said set of weight values to correspond to said given set in order to null said at least one interfering signal.

21. A method for receiving a plurality of GPS signals according to claim 20, wherein:

step g) identifies a direction of arrival for each one of said interfering signals and generates said given set of weight values such that antennae nulls are provided for directions corresponding to said direction of arrival for said interfering signals.

22. A method for receiving a plurality of GPS signals according to claim 21, wherein:

step g) generates said given set of weight values by i) calculating a set of eigenvectors of a covariance matrix derived from said components, ii) defining a spatial spectrum based upon said set of eigenvectors, iii) locating peaks in said spatial spectrum, and iv) calculating said given set of weight values based upon location of said peaks in said spatial spectrum, to thereby provide nulls in the direction of unwanted GPS signals and gain in the direction of direct line of sight GPS signals.

23. A method for receiving a plurality of GPS signals according to claim 19, wherein:

step b) utilizes an array of bandpass filter stages and frequency shifting mixers that are adapted to convert GPS signals received at said antenna elements in a frequency-division-multiplexed manner.

24. A method for receiving a plurality of GPS signals according to claim 19, wherein:

said analog signal derived from said composite signal comprises one of an intermediate frequency signal and a baseband signal.

25. A method for receiving a plurality of GPS signals according to claim 24, wherein:

said intermediate frequency signal is produced by downconversion of said composite signal.

26. A method for receiving a plurality of GPS signals according to claim 19, wherein:

step e) utilizes a downconverting mixer logic block and low pass filter logic block corresponding to said second set of frequency bands to produce said GPS signal components.

27. A method for receiving a plurality of GPS signals according to claim 19, wherein:

step f) utilizes an array of complex digital multipliers that multiplies said GPS signal components that multiplies data output by a weight vector supplied thereto.

28. A method for receiving a plurality of GPS signals according to claim 19, wherein:

said plurality of antenna elements comprises a plurality of patch antenna elements spatially arranged in a hexagonal pattern.

29. A method for receiving a plurality of GPS signals according to claim 28, wherein:

said patch antenna-elements are spaced apart by a ½ wavelength of said GPS signals.

30. A method for receiving a plurality of GPS signals according to claim 19, wherein:

step b) generates signals within successive bands in said second set of frequency bands, each successive band pair having center frequencies separated by 12.5 MHz.

31. A method for receiving a plurality of GPS signals according to claim 19, further comprising the steps of:

summing said GPS signal components to generate a combined signal in digital form;

converting said combined signal into analog form; and modulating said combined signal onto a carrier signal within said first predetermined frequency band for output to a GPS receiver.

32. A method for receiving a plurality of GPS signals according to claim 19, further comprising the steps of:

outputting said GPS signal components to a multi-channel GPS correlator circuitry and microprocessor.

33. A method for receiving a plurality of GPS signals according to claim 20, further comprising the step of:

identifying an estimated pointing direction of a GPS satellite with respect to said GPS signal receiver and adjusting said given set of weight values in accordance with said estimated pointing direction.

34. A method for receiving a plurality of GPS signals according to claim 33, further comprising the step of:

performing scanning mode operations that scan over a range of antenna pointing directions to identify a pointing direction with maximum signal strength.

35. A method for receiving a plurality of GPS signals according to claim 33, further comprising the step of:

performing tracking mode operations that dither over a range of antenna pointing directions to identify a pointing direction with maximum signal strength.

* * * * *